Feb. 27, 1968  D. R. HAMERLA  3,371,275
DC VOLTAGE COMPARATOR
Filed Aug. 3, 1964  2 Sheets-Sheet 1

INVENTOR.
Donald R. Hamerla
BY: Harry M. Saragovitz,
Edward J. Kelly &
Herbert Berl

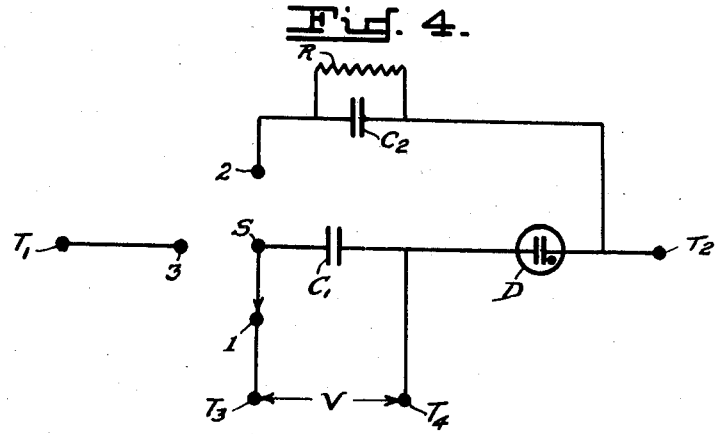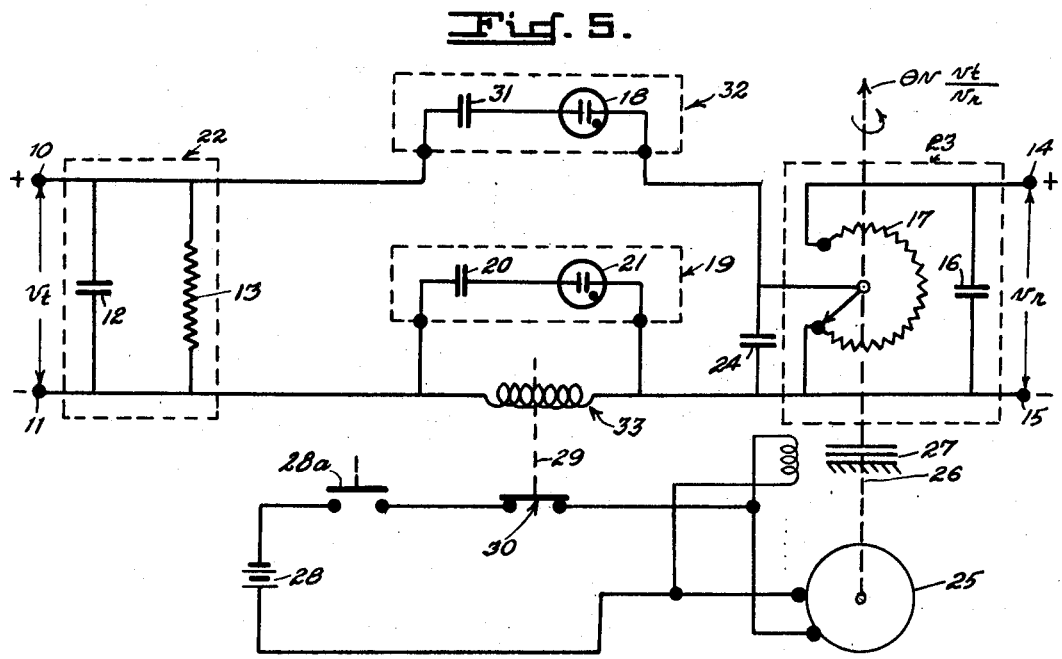

United States Patent Office 3,371,275
Patented Feb. 27, 1968

3,371,275
DC VOLTAGE COMPARATOR
Donald R. Hamerla, King of Prussia, Pa., assignor to the United States of America as represented by the Secretary of the Army
Filed Aug. 3, 1964, Ser. No. 387,558
2 Claims. (Cl. 324—140)

ABSTRACT OF THE DISCLOSURE

A DC voltage comparator consisting of a first RC circuit to which a test voltage is applied and a second RC circuit to which a reference voltage is applied and wherein the resistance element thereof comprises a potentiometer, the rotating arm of which is mechanically coupled to motor. A Ruehlemann comparator couples one terminal of the first RC network to the potentiometer arm. A second Ruehlemann comparator couples another terminal of the first RC network and has in shunt therewith a relay adapted to disconnect a power source from the motor when the first mentioned Ruehlemann comparator discharges through a capacitor to trigger the second Ruehlemann comparator, whereupon the potentiometer arm and motor cease rotating, the degree of rotation of the potentiometer arm being indicative of the ratio of the aforementioned voltages.

---

This invention relates to means for measuring or comparing DC voltages and more particularly to such a means wherein a fuzing of rockets in which it is desired to reset a fuzing timer after burnout of the rocket motor to correct for variations in the rocket motor performance. One method of accomplishing this is the utilization of an integrating accelerometer to transform the rocket velocity at burnout into a voltage. The setting of the fuze timer is then varied from its minimum preset value as the accelerometer voltage varies from its predicted minimum value. Specifically, a fuzing timer resetting shaft is driven by means of a servo system. A simple servo system is inadequate because the fuzing timer is incapable of being reset as fast as the accelerometer voltage varies. A two step servo system may be used which sets a potentiometer from the accelerator at burnout and subsequently resets thte fuzing timer from the potentiometer, the potentiometer being essentially a memory device. However, such a system involved undesired complications.

An object of the invention is a new and novel means for comparing or measuring DC voltages used to reset fuzing timers after burnout of rocket motors to correct for variations in rocket motor performance.

Another object of the invention is a new and novel voltage comparator wherein the output pulse obtained therefrom appears in the same circuit as the voltages being compared and wherein the major part of the pulse appears across the load to which it is applied.

Another object of the invention is a voltage comparator wherein the ratio of the voltages being compared is displayed as a shaft rotation.

A still further object of the invention is a voltage comparator which is compatible with a high impedance input signal source.

Other objects of the invention will become apparent from the following description and accompanying drawings wherein:

FIGURE 4 is an equivalent circuit diagram of Ruehlemann comparator; and,

FIGURE 5 is a schematic diagram of a preferred embodiment of the invention.

Figure 1:
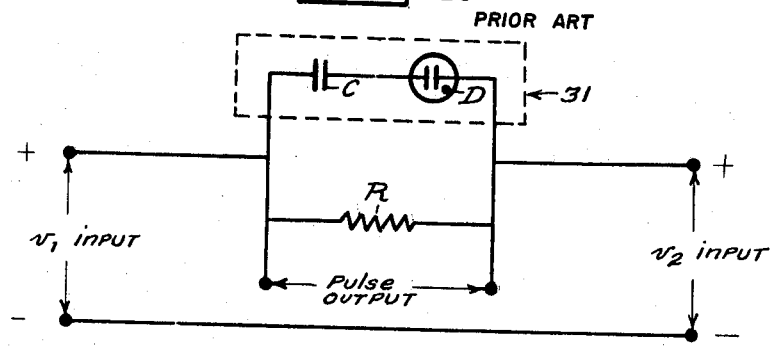
FIGURE 1 is a circuit diagram of a Ruehlemann comparator with a parallel load.

FIGURE 1 shows a typical circuit using a Ruehlemann comparator 31, consisting of a capacitor C and gas-diode D, and a parallel connected load R. The reference characters $v_1$ and $v_2$ represent the voltages being compared. This circuit is not desirable because the load impedance would need to be at least as high as that of the Ruehlemann so as not to load the input signal sources. Load impedances of $10^{12}$ ohms or more are impractical. Furthermore, they would not be properly matched to the Ruehlemann for maximum transfer upon receipt of the output pulse.

Figure 2:
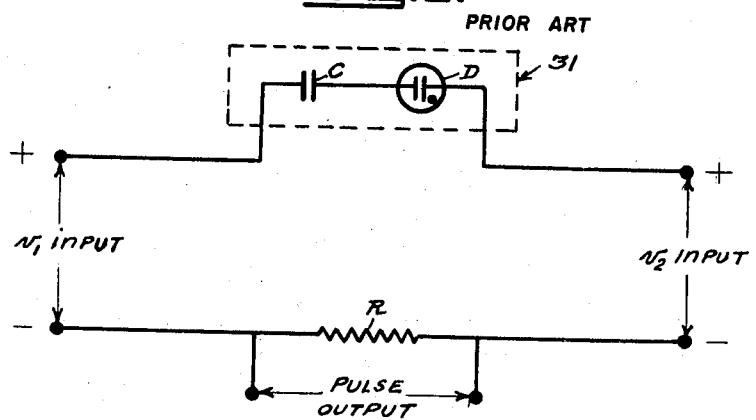
FIGURE 2 is a circuit diagram of a Ruehlemann comparator with a series load.

FIGURE 2 shows the load R connected in series with the comparator and the input signal sources, $v_1$ and $v_2$. This circuit will not function unless the impedance of the input signal sources is low. Therefore, since many common input signal sources are impedance transducers, this circuit has limited application.

Figure 3:
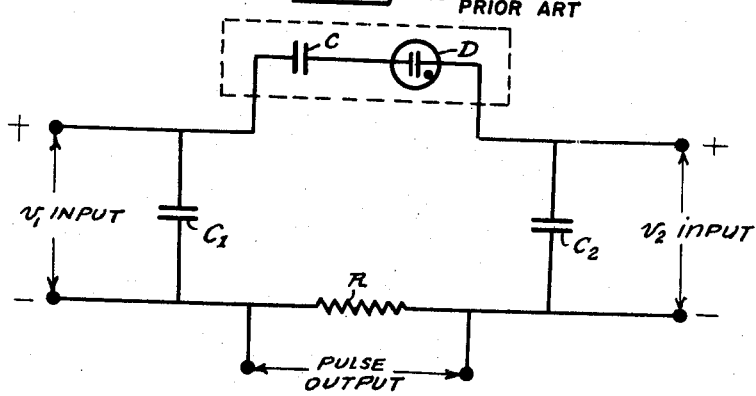
FIGURE 3 is a circuit diagram of an RC timer utilizing a Ruehlemann comparator.

FIGURE 3 shows one such application utilizing an RC timer. Here the output pulse indicates the end of the time interval during which $C_1$ discharges to the reference voltage on $C_2$. The capacitors offer a low impedance to the output pulse.

The invention involves the use of a Ruehlemann comparator in a circuit wherein efficient use of the output pulse is obtained and which appears in the same circuit as the voltages being compared. The Ruehlemann comparator, for the purpose of discussion, can be considered as a black box with two terminals. It acts as an accurate DC zero voltage reference. If a varying DC voltage is impressed on the terminals, it will behave as an opened circuit for all negative values of the impressed voltage. However, when the impressed voltage passes through zero in the positive direction, the black box acts as a pulse generator, and delivers the pulse to an external circuit. During the time a measurement is being conducted, the black box effectively consists of a charged capacitor in series with a gas-diode across the output terminals. To further facilitate an understanding of the invention a detailed description of a Ruehlemann comparator, the circuit diagram of which is illustrated in FIGURE 4, follows. Prior to using this device as a comparator switch, switch S is rotated to position 1. Voltage V applied to terminals $T_3$ and $T_4$ charges capacitor $C_1$ to a voltage $V_{C1}$ which is set to exceed the breakdown voltage $V_{D0}$ of gas-diode D. Next switch S is switched to position 2. Since voltage $V_{C1}$ exceeds the breakdown voltage $V_{D0}$ of gas-diode D, the diode conducts thus discharging the capacitor $C_1$ and charging capacitor $C_2$. $C_1 \gg C_2$ therefore the change in $V_{C1}$, $\Delta V_{C1}$, $\ll$ the change in $V_{C2}$, $\Delta V_{C2}$, if $R \gg$ any other circuit impedance. The diode continues to conduct until the diod voltage $V_D = V_{C1} - V_2 < V_{De}$, the extinction voltage of the diode. At this time the diode stops conducting and $C_2$ discharges through the resistor R until $V_D = V_{C1} - V_{C2} > V_{D0}$ at which time the diode again conducts and the cycle repeats. The foregoing description of the process is known as stabilization of $V_{C1}$. It proceeds until $V_{C1} \leq V_{D0}$. At this time stabilization is complete and the process stops. The switch S can now be switched to position 3. The circuit is now in its measuring or comparing state. Any voltage applied to terminals $T_1$ and $T_2$ of the same polarity as that of $V_{C1}$ will cause the diode to conduct and deliver a pulse to an external circuit. Ideally the accuracy of this device would be 100%, i.e. the applied voltage need only exceed zero by an infinitesimal amount. Actually the accuracy is equal to the sum of the difference between $V_{C1}$ and $V_{D0}$ during the measurement and the product of the rate of change of voltage applied to terminals $T_1$ and $T_2$, and the ionization time of the diode. Neglecting the leakage of capacitor $C_1$ the difference between $V_{C1}$ and $V_{D0}$ equals a maximum of $\Delta V_{C1}$.

FIGURE 5 is a schematic diagram of the invention for measuring or comparing DC voltages which includes two Ruehlemann comparators arranged for compatibility with high impedance signal sources in addition to means for comparing two stored values of voltage and means for displaying the ratio of the remembered values in terms of a shaft rotation.

The test voltage represented by $v_t$ is applied to input terminals 10 and 11 to charge test capacitor 12 of an RC timer 22 consisting of a parallel circuit comprising capacitor 12 and resistor 13. Another pair of input terminals 14 and 15 has applied thereto a reference voltage represented by $v_r$ which charges reference capacitor 16 of RC timer 23 consisting of parallel connected potentiometer 17 and reference capacitor 16 connected across the terminals 14 and 15. A Ruehlemann comparator 32 comprising a series connected capacitor 31 and gas-diode 18 has the capacitor terminal thereof coupled to RC timer 22 at terminal 10 and the gas-diode terminal thereof to the rotating arm of potentiometer 17. A relay 33 is connected in series with terminals 11 and 15. A second Ruehlemann comparator 19 which consists of a series connected capacitor 20 and gas-diode 21 is in shunt with the coil of relay 33, its capacitor terminal being returned to the RC timer 22 at terminal 11 and its gas-diode terminal returned to RC timer 23 at terminal 15. Capacitor 24 couples Ruehlemann comparators 32 and 19 through their respective gas-diodes. The DC motor 25 and the rotating arm of potentiometer 17 are mounted on a common shaft 26, including a magnetic clutch-brake 27. The reference numeral 28 indicates the power source connected to motor 25 through series connected start-test switch 28a and the normally closed contacts 30 of relay 33. In operation, the start-test switch 28a is closed whereupon motor 25 rotates the arm of potentiometer 17 and continues to rotate it until an electrical pulse from Ruehlemann 19 activates relay 33 causing the armature 29 thereof to open contacts 30 whereupon the motor 25 and arm of potentiometer cease rotating, the angular displacement of the potentiometer arm indicating the ratio of the test voltage to the reference volage.

A basic innovation in this invention is the use of potentiometer, as described above, to vary one of the voltages being compared. In the standard Ruehlemann timing circuit, this voltage is allowed to vary according to the exponential law which governs an RC discharge. In the circuit of the invention, the voltage on the reference capacitor 16 is applied to the high resistance potentiometer 17 and the output of the potentiometer is compared with the voltage on the capacitor 12. The discharge of capacitor 16 through potentiometer 17 is compensated for by placing the resistor 13 across the test capacitor 12. The value of resistor 13 is of such magnitude as to make the discharge time constant of the test capacitor equal to that of the reference capacitor. As a result, at the firing of gas-diode 21, the ratio of capacitor 12 voltage to capacitor 16 voltage is still the same as it was at the instant of charging and this ratio is indicated precisely by the angular displacement of the potentiometer 17.

The potentiometer used in the circuit of FIGURE 5 has a high resistance and two voltage comparators, capacity coupled, are used to obtain a large output to the load, relay 33, at firing. This arrangement permits larger energy output to be obtained. In this arrangement, capacitor 31 must be charged as close to the voltage breakdown value of its diode 18 as possible, whereas, capacitor 20 need only be charged to a value near enough to the breakdown voltage of diode 21 so that the firing pulse of comparator 32 will trigger comparator 19 whereby energy is delivered to relay 33 upon breakdown of comparator 19 to reliably actuate relay 33. The load of the voltage comparator 32 is the parallel combination of the relay 33 and voltage comparator 19. This parallel load is in series with voltge comparator 32, the input voltage source, capacitor 12, and the variable reference voltage source, capacitor 16. If capacitor 24 were disconnected most of output voltage pulse of comparator 16 would appear across the potentiometer 17. However, with capacitor 24, connected as shown, a sufficient voltage pulse will appear across comparator 19 to trigger it. This capacitor is small enough so as not to load the test voltage source, but will act as a low impedance shunt to the comparator 16 output pulse for a sufficient length of time to definitely trigger comparator 19. After comparator 19 has been triggered, it will provide sufficient energy to operate relay 33. Since the relay 33 is in parallel with the comparator 19, there is no impedance problem involved in matching the load 33, to comparator 19.

I claim:
1. A voltage comparator for producing a signal proportional to the ratio of a test voltage to a reference voltage comprising a first RC network comprising a parallel connected resistor and capacitor to which a test voltage is applied, a second RC network comprising a parallel connected potentiometer and capacitor to which a reference voltage is applied, a first voltage sensitive circuit comprising a series connected capacitor and gas-diode, a second voltage sensitive circuit comprising a series connected capacitor and gas-diode, a coupling capacitor coupling said voltage sensitive circuits, the first voltage sensitive circuit connected between one terminal of the first RC network and the rotatable arm of the potentiometer, the second voltage sensitive circuit connected between another terminal of the first RC network and the corresponding terminal of the second RC network, a relay in parallel with said second voltage sensitive circuit, and means operatively coupled to said relay for indicating the ratio of the test voltage to the reference voltage when said first voltage sensitive circuit triggers said second voltage sensitive circuit through said coupling capacitor.

2. The invention as set forth in claim 1 wherein said means operatively coupled to said relay comprises a motor, a power source for said motor, a clutch, a shaft coupling said motor to the rotating arm of the potentiometer through said clutch, the contacts of said relay being in series with said power source and motor, said relay in response to a pulse from said second voltage sensitive means disconnects said power source from said motor whereupon the rotation of said motor and arm of said potentiometer ceases, the angular displacement of the arm of said potentiometer being indicative of the ratio of the test voltage to the reference voltage.

References Cited

UNITED STATES PATENTS

| | | | |
|---|---|---|---|
| 2,762,976 | 9/1956 | Conant | 324—98 |
| 2,790,146 | 4/1957 | Livingston | 324—140 |
| 3,120,663 | 2/1964 | Beaman | 324—98 X |

RODNEY D. BENNETT, *Primary Examiner.*

CHESTER L. JUSTUS, *Examiner.*

G. M. FISHER, D. C. KAUFMAN,
*Assistant Examiners.*